United States Patent [19]

Lakshmanan et al.

[11] Patent Number: 4,833,192
[45] Date of Patent: May 23, 1989

[54] COMPATIBLE POLYMER BLENDS USEFUL AS MELT ADHESIVES (II)

[75] Inventors: Pallavoor R. Lakshmanan, Houston; Paula J. Carrier, Seabrook, both of Tex.

[73] Assignee: Baychem International, Inc., Houston, Tex.

[21] Appl. No.: 193,752

[22] Filed: May 12, 1988

[51] Int. Cl.$^4$ .................. C08K 5/01; C08L 23/20; C08L 23/08
[52] U.S. Cl. ........................... 524/476; 524/478; 524/481; 524/487; 524/488; 524/490; 524/491; 524/579; 525/210
[58] Field of Search ............ 524/476, 478, 481, 487, 524/488, 490, 491, 579; 525/210

[56] References Cited

U.S. PATENT DOCUMENTS

| | | | |
|---|---|---|---|
| 3,993,613 | 11/1976 | Doss et al. | 524/490 |
| 4,361,672 | 11/1982 | Figfirwal et al. | 524/483 |
| 4,554,304 | 11/1985 | Hansen et al. | 524/488 |
| 4,568,713 | 2/1986 | Hansen et al. | 524/488 |
| 4,759,984 | 7/1988 | Hwo | 428/475.8 |
| 4,761,450 | 8/1988 | Lakshmanan et al. | 524/488 |

Primary Examiner—Herbert J. Lilling
Attorney, Agent, or Firm—Joseph J. Carducci

[57] ABSTRACT

Compatible polymer blends useful as melt adhesives comprising a copolymer of butene-1 and from about 5.5 to about 20 weight percent of ethylene or propylene, a hydrocarbon tackifier and a low molecular weight liquid polybutene having a molecular weight greater than about 2000.

17 Claims, No Drawings

COMPATIBLE POLYMER BLENDS USEFUL AS MELT ADHESIVES (II)

BACKGROUND OF THE INVENTION

1. Field of the Invention

This invention relates to compatible polymer blends useful as melt adhesives comprising (1) a copolymer of butene-1 and from about 5.5 to about 20 weight percent of ethylene or propylene; (2) a hydrocarbon tackifier; and (3) a liquid polybutene having a molecular weight greater than about 2000.

2. Description of the Prior Art

Hot melt adhesives have found extensive use in industry in bonding, joining or fabrication of various structures, including construction of structures from synthetic polymeric films, such as polyethylene, polypropylene, etc.; foil, including metal foil such as aluminum foil, wax-coated or wax-impregnated cellulosic structures; and various non-woven materials whose constituents are based on polyolefins, polyesters, polyamides and acrylic-type polymers.

The modern trend in the packaging industry, for example, is to use more of the plastic-based or plastic-finished constructions, such as polyethylene or polypropylene extrusion coated or laminated boards. Such structures are replacing conventional clay-coated boards in many packaging applications. The advantages of using composite construction of plastic-to-plastic or plastic-to-paper, and other such combinations, are several, for example, with respect to aesthetics, print graphics, barrier properties toward moisture (humidity), oxygen and odor, etc. A better barrier, for example, will prevent, or tend to inhibit, spoilage of the packaged contents. Plastic-utilized composite constructions are now routinely used for beverage cartons or sleeves, to hold dry goods and consumable items, frozen juice, household detergents and cleaners, poultry and fresh produce packages, etc.

The change in various packaging laminate from paper or paperboard to plastic and non-woven products based on synthetic polymers also necessitates that the various adhesives chosen to hold the structures together be compatible with the materials of construction, since the altered surface chemistry of such materials may not be adhesion compatible with traditionally-available hot melt adhesives.

Thus, it is important that the hot melt adhesives used to prepare the various composites be compatible with the materials of construction and that they exhibit good specific adhesion thereto, particularly wherein such materials are made using synthetic polymers, such as polyethylene, polypropylene, etc.

In addition, since hot melt adhesives are a multicomponent system which experiences prolonged elevated temperature exposures, for example at 350° F. (176.6° C.) or even higher, in production or in use, it is especially important that they show melt stability over a period of time until their use and not lose their homogeneity, become unstable and exhibit stratification, resulting in substantial loss in their adhesive performance. Moreover, some hot melt adhesives, even at such elevated temperatures, are still so viscous, for example, they can have a viscosity at such temperatures well above 15,000 cps, that they can be applied to the substrate with only very great difficulty.

We have found that the novel polymeric blends defined and claimed herein, that is, containing a copolymer of butene-1 and from about 5.5 to about 20 weight percent of ethylene or propylene; a hydrocarbon tackifier; and a low molecular weight liquid polybutene are eminently useful as a hot melt adhesive with the substrates defined above, in that they are compatible therewith, exhibit remarkable adhesion thereto and remain stable at elevated temperatures of application.

SUMMARY OF THE INVENTION

The novel compatible polymer blends useful as hot melt adhesives defined and claimed herein comprise (1) a copolymer of butene-1 and from about 5.5 to about 20 weight percent of ethylene or propylene, (2) a hydrocarbon tackifier; and a low molecular weight liquid polybutene having a molecular weight greater than about 2000.

The copolymer of butene-1 and ethylene or propylene used herein are high molecular weight polymers, generally rigid at atmospheric temperatures but easily flowable when heated. Their melt index, determined in accordance with ASTM D 1236 is desirably in the range of about 0.3 to about 2000 grams/10 minutes, or even higher, preferably in the range of about 3.0 to about 2000 grams/10 minutes. Since ethylene, and even propylene, can be present during the polymerization process when butene-1 is polymerized to prepare the butene-1 copolymer that can be used herein, the resulting polymers will contain from about 5.5 to about 20, generally from about 5.5 to about 10, weight percent of ethylene or propylene. Definitions of suitable butene-1 copolymers useful in the preparation of the novel hot melt adhesives claimed herein can be found, for example, in U.S. Pat. No. 4,568,713 to Hansen.

The hydrocarbon tackifiers suitable for use in preparing the novel hot melt adhesives claimed herein can be selected from any hydrocarbon tackifier generally used, or suitable for use, in the preparation of hot melt adhesives. A particularly suitable tackifier can be obtained from commercially available hydrocarbon resins resulting from the polymerization of monomers consisting of olefins, cycloolefins and diolefins, for example, residual byproduct monomers resulting from the manufacture of isoprene. Such tackifiers are described, for example, in U.S. Pat. Nos. 3,932,330 to Lakshmanan, 4,022,728 to Trotter et al and 4,072,735 to Ardemagni. Such petroleum-derived hydrocarbon resins are sometimes also referred to as synthetic terpene resins. Other types of tackifiers also suitable for use herein include products obtained from cyclopentadiene and dicyclopentadiene polymerization and subsequent hydrogenation, conventional terpene resins and modified terpene resins obtained as a result of the polymerization of such terpene-derived monomers, such as alpha- and beta-pinene and limonene. Petroleum hydrocarbon resins that have been post hydrogenated to yield a more thermally stable resin are especially preferred. The tackifier used to prepare the novel melt adhesive compositions claimed herein will typically exhibit a ring and ball softening point (ASTM E 28) in the range of about 10° to about 150° C., preferably about 25° to about 120° C.

The third necessary component required to prepare the novel hot melt adhesives claimed herein is a low molecular weight liquid polybutene. These low molecular weight liquid polybutenes are polymers of isobutylene and butenes, composed predominantly of monolefins having four carbon atoms, that is, from about 85 to about 98 weight percent, with the remainder being composed predominantly of isoparaffins. In order to obtain the results desired herein it is critical that low molecular weight liquid polybutenes so used have a molecular weight (as determined by a Mechrolab Osmometer) at least greater than about 2000, preferably in the range of about 2000 to about 6000. Polybutenes that can be used herein are described, for example, in U.S. Pat. No. 4,072,735 to Ardemagni.

The three components required to obtain the novel hot melt adhesives claimed herein can be present in the amounts defined below in Table I.

TABLE I

| | Weight Percent | |
|---|---|---|
| | Broad Range | Preferred Range |
| (1) Butene-1 Copolymer | 20–60 | 25–50 |
| (2) Hyrdocarbon Tackifier | 20–50 | 25–40 |
| (3) Low Molecular Weight Liquid Polybutene | 10–60 | 15–40 |

In an embodiment herein, our novel hot melt adhesive can have incorporated therein a paraffin or a microcrystalline wax in order to reduce the viscosity thereof to facilitate the application of the adhesive to a substrate. Paraffin waxes used are those composed mainly of straight chain or branched chain molecules. Fully refined paraffin waxes suitable for use herein have melting points ranging from about 115° F. (46.1° C.) to about 155° F. (68.3° C.). Microcrystalline waxes that are useful are those that are complex mixtures of monocyclic and polycyclic hydrocarbons, along with lesser amounts of branch chains and isoparaffins containing only minor amounts of normal paraffins. The crystals of microcrystalline waxes are much smaller than those of paraffin waxes. The melting points of the microcrystalline waxes will range from about 140° F. (60.0° C.) to about 190° F. (87.8° C.). When a wax is used it can be present in an amount upto about 40 weight percent, based on the final adhesive composition, but generally the amount used will be less than about 25 weight percent.

Since hot melt adhesives tend to experience varying degrees of thermal exposure during thermal processing and/or during application to the substrate, it is desirable to incorporate therein one or more antioxidants in small amounts to inhibit thermal and/or thermoxidative degradation. Several types of commercial products, predominantly of the hindered phenol types, are available for this purpose to function as primary antioxidants. A secondary antioxidant belonging to the general classification of thioesters and phosphites can also be used in combination with the hindered phenols. Exemplary of antioxidants suitable for use herein include tetrakis [methylene 3-(3',5'-di-t-butyl-4-hydroxyphenyl)propionate] methane; 2,2'-ethyldenebis (4,6-di-tertiary-butylphenol); 1,1-3-tris (2-methyl-4-hydroxy-5-t-butyl phenyl) butane; and 1,3,5-trimethyl-2,4,6-tris (3,5-tert-butyl-4-hydroxybenzyl) benzene. Secondary antioxidants, such as dilaurylthiodipropionate; pentaerythritol tetrakis (beta-laurylthiopropionate) and various alkyl-, aryl-, di- and polyphosphites and thiophosphites can also be employed in combination with appropriate hindered phenols. Effective amounts of antioxidants that can be used can range from about 0.05 to about five weight percent, preferably from about 0.1 to about 2.5 weight percent, based on the weight of the final adhesive composition.

The preparation of the novel hot melt adhesive claimed herein is not critical and any suitable method can be employed. In a preferred embodiment in a mixing vessel are placed sufficient amounts of liquid polybutene, tackifier and the requisite amount of antioxidant at room temperature. The contents are then heated gradually to a point of softening of the mixture. At this point stirring is commenced and the temperature is raised to a range of about 325° F. (162.8° C.) to about 400° F. (204.4° C.). At this point the requisite amount of butene-1 copolymer is added in small quantities with continued mixing until the completion of the addition of the butene-1 copolymer. Mixing is continued to a mass homogeneity. If wax is also used it is added at the outset. The total mixing time is generally in the range of about 0.5 to about two hours.

DESCRIPTION OF PREFERRED EMBODIMENTS

The present invention can further be illustrated by the following. A number of compositions were prepared using a 500 milliliter stainless steel beaker which was heated by a Glas-col mantle capable of providing temperatures ranging from 350° F. (176.6° C.) to 380° F. (193.3° C.). A Talboys T-line Lab Stirrer was used to mix the various compositions. Tackifier, liquid polybutene and antioxidant were placed in the stainless steel beaker. Heating was begun, starting at room temperature, until the desired compounding temperature was reached. Stirring was commenced to homogenize the mass, at which point the requisite amount of butene-1 copolymer was added in small quantities with continued mixing. At the completion of the addition of the butene-1 copolymer, stirring was continued to homogeneity. When wax was added, this was done at the outset. In Table III, below, in each of base runs Nos. 1 and 2, the above procedure was also used, except that in place of liquid polybutene wax was added to prepare the desired composition. Total mixing time ranged from about one to about 1½ hours. The mixed composition was then collected on a release line tray.

The thermal stabilities of the adhesive compositions that were prepared were determined by exposing about eight to ten gram quantities of a sample in a five-inch×one-inch test tube to a temperature environment of 350° F. (176.6° C.) for 24 hours. At the end of 24 hours, the composition was visually observed for any separation stratification and loss in composition homogeneity. The ring and ball softening points of the compositions were determined according to ASTM Procedure E 28. The melt viscosities of the compositions were determined according to ASTM Procedure D 3236, while the needle penetrations were determined according to ASTM D 1321.

To determine peel strength values of the compositions, polyethylene laminated test specimens were prepared by applying the compositions to a 4.0 mil (one inch by four inch) high density polyethylene film by means of a Slautterback "minisquirt" hot melt gun. The composition was applied at 350° F. (176.6° C.) to the film as a continuous strip ½-inch wide across the film width and then a film of the same dimensions was placed on top of the film carrying the strip of the composition. A silicone release sheet was then placed on the top of the assembly and sufficient contact pressure was applied via a rubber roller to spread the adhesive and to bring it into intimate contact with the surfaces. The laminates were then aged for a minimum of 24 hours prior to testing. Three specimens for each composition were prepared and the bond strength was measured by peeling at the glue line by means of a J. J. Lloyd Tensile Tester at a peel rate of 50 millimeters per minutes. The maximum force in grams necessary to cause rupture of the bond was noted. The average of three such determinations was recorded.

Polypropylene test specimens were prepared by applying the compositions so prepared to a 3.0 mil (one inch by six inch) polypropylene film by means of a Slautterback "minisquire" hot melt gun. The composition was applied to the film as a continuous ½-inch strip across the width (one inch) of the substrate. Then a film of the same dimension was placed on top of a film carrying the strip of the composition. A silicone release sheet was then placed on the top of the assembly and sufficient contact pressure was applied via a rubber roller to spread the adhesive and to bring it into intimate contact with the surfaces. The laminates were then aged for 24 hours prior to testing. Three such assemblies were prepared for each adhesive evaluation. Testing procedures were the same for the polyethylene specimens.

The components used in the preparation of the polymer blends are identified below in Table II. In the tables below, the butene-1 copolymers are referred to as polybutylene.

TABLE II

List Of Raw Materials

| | Supplier | Trade Name | Characteristics |
|---|---|---|---|
| Polymer | | | |
| Polybutylene | Shell Chemical | Duraflex 8910 | Density, 0.895; M.I. 500 Ethylene Content, 5.5% by wt. |
| Polybutylene | Shell Chemical | Duraflex 8X10 | Density, 0.895; M.I. 100 Ethylene Content, 5.5% by wt. |
| Polybutylene | Shell Chemical | Duraflex 0400 | Density, 0.915; M.I. 20 Homopolymer |
| Polybutylene | Shell Chemical | Duraflex 0800 | Density, 0.915; M.I. 200 Homopolymer |
| Tackifier | | | |
| Petroleum Hydrocarbon Resin | Goodyear Chemicals | Wingtac 95 | Ring & Ball Soft. Pt. 95 C. |
| Petroleum Hydrocarbon Resin | Exxon Chemicals | Escorez 1310 | Ring & Ball Soft. Pt. 95 C. |
| Hydrogenated Cyclopentadiene | Exxon Chemicals | Escorez 5380 | Ring & Ball Soft. Pt. 115 C. |
| Polyterpene Resin | Hercules Inc. | Piccolyte C115 | Ring & Ball Soft. Pt. 115 C. |
| Hydrogenated Rosin Ester | Hercules Inc. | Foral 85 | Ring & Ball Soft. Pt. 85 C. |
| Wax | | | |
| Microcrystalline Wax | Witco Chemicals | Multiwax 180M | Melt Point 185 F. (85 C.) |
| Microcrystalline Wax | Shell Chemical | Shellmax 400 | Melt Point 177 F. (80.55 C.) |
| Paraffin Wax | Shell Chemical | Shellwax 300 | Melt Point 159 F. (70.55 C.) |
| Hydrogenated Cottonseed Oil | Capital City Products | Capital 5330 | Melt Point 144 F. (62.22 C.) |
| Polybutene | | | |
| Low mol. Weight Polybutene | Exxon Chemicals | Parapol 2200 | Molecular Weight 2200 |
| Low mol. Weight Polybutene | Amoco Chemicals | Indopol H-100 | Molecular Weight 920 |
| Low mol. Weight Polybutene | Amoco Chemicals | Indopol H-300 | Molecular Weight 1290 |
| Antioxidant | | | |
| Hindered Phenol | Schenectady Chemicals | Isonox 129 | Melt. Point. 162 C. |
| Dilauryl thiodipropionate (DLTDP) | Evans Chemetics | DLTDP | Melt. Point. 40 C. |

Data obtained in base runs are set forth below in Table III.

TABLE III

| Run No. | 1 | 2 | 3 | 4 | 5 |
|---|---|---|---|---|---|
| Polybutylene, Duraflex 8910 | 30.00 | 30.00 | — | — | 46.00 |
| Polybutylene, Duraflex 0400 | — | — | 30.00 | — | — |
| Polybutylene, Duraflex 0800 | — | — | — | 30.00 | — |
| Wingtack 95 (Tackifier) | 35.00 | 35.00 | — | — | 54.00 |
| Foral 85 (Tackifier) | — | — | 35.00 | 35.00 | — |
| Shellmax 400 (Wax) | 35.00 | — | — | — | — |
| Shellwax 300 (Wax) | — | 35.00 | — | — | — |
| Capital 5330 (Hydrogenated Cottonseed Oil-Saturated) | — | — | 35.00 | 35.00 | — |
| Isonox 129/DLTDP (1:3 wt. ratio) | 0.40 | 0.40 | 0.40 | 0.40 | 0.40 |
| Total | 100.40 | 100.40 | 100.40 | 100.40 | 100.40 |
| Properties | | | | | |
| Stability | OK | OK | OK | OK | OK |
| Ring & Ball Soft. Pt., °F. | 188 | 185 | 228 | 220 | 245 |
| (°C.) | (86.7) | (85.0) | (108.9) | (104.4) | (118.3) |
| Viscosity, cps, 350° F. (176.6° C.) | 425 | 300 | 4700 | 800 | 51,000 |
| N.P., decimillimeter (dmm), 77° F. (25° C.) | 11.3 | 9.7 | 3.7 | 4.2 | 1.8 |
| Performance | | | | | |
| Peel Strength, g/in., 50 mm/min. | | | | | |
| HDPE/HDPE (4 mil) | 900 | 180 | Fail | Fail | Fail |
| PP/PP (3 mil) | 135 | 180 | Fail | Fail | Fail |

It can be seen from Runs Nos. 1 and 2 in Table III above that when only wax is added to a hot melt adhesive containing a copolymer of butene-1 and ethylene (Duraflex 8910, which contains 5½ weight percent ethylene) and a tackifier, the resulting adhesive provides only marginal adhesion to high density polyethylene (HDPE) and polypropylene (PP) surfaces. The minimum desired peel strength for adhesion to HDPE is at least 1000 grams/inch and to PP is at least 500. Even worse results were obtained in Runs Nos. 3 and 4 wherein a hydrogenated castor oil wax diluent (Capital 5330) was added to a hot melt adhesive containing Duraflex 0400 or Duraflex 0800 (essentially homopolymers of butene-1, i.e., isotactic polybutylene) and a tackifier. In Run No. 5 wherein the hot melt adhesive contained solely the same copolymer of butene-1 and ethylene used in Run No. 1 (Duraflex 8910) and a tackifier no adhesion strength was found and the viscosity rose to 51,000 cps at 350° F. (176.6° C.).

An additional series of runs was made similar to Runs Nos. 1 and 2 of Table III but wherein wax was replaced with a low molecular weight (2200) liquid polybutene. Similarly, the runs are similar to Run No. 5, except that the low molecular weight (2200) liquid polybutene was added to the composition. The data obtained are set forth below in Table IV.

TABLE IV

|  | Run No. | | | |
|---|---|---|---|---|
|  | 6 | 7 | 8 | 9 |
|  | Parts by Weight, Grams | | | |
| Polybutylene, Duraflex 8910 | 30.00 | 30.00 | 30.00 | — |
| Polybutylene, Duraflex 8 × 10 | — | — | — | 30.00 |
| Wingtack 95 (Tackifier) | 35.00 | — | — | — |
| Piccolyte C115 (Tackifier) | — | 35.00 | — | — |
| Escorez 1310 (Tackifier) | — | — | 35.00 | — |
| Escorez 5380 (Tackifier) | — | — | — | 50.00 |
| Parapol 2200 low mol. wt. polybutene | 35.00 | 35.00 | 35.00 | 20.00 |
| Isonox 129/DLTDP (1:3 wt. ratio) | 0.40 | 0.40 | 0.40 | 0.40 |
| Total | 100.40 | 100.40 | 100.40 | 100.40 |
| Properties | | | | |
| Stability | OK | OK | OK | OK |
| Ring & Ball Soft. Pt. | | | | |
| (R & B)°F. | 204 | 193 | 192 | 213 |
| (°C.) | (95.5) | (89.4) | (88.9) | (100.5) |
| Viscosity, cps, 350° F. (176.6° C.) | 1425 | 2400 | 1900 | 4050 |
| N.P., decimillimeter. (dmm), 77° F. (25° C.) | 27.4 | 20.0 | 27.0 | 24.4 |
| Performance Peel Strength, g/in., 50 mm/min. | | | | |
| HDPE/HDPE (4 mil) | 3150 | 2970 | 2115 | 4770 |
| PP/PP (3 mil) | 2025 | 2745 | 1050 | 2520 |

From the above data, it can be seen that when a low molecular weight liquid polybutene having a molecular weight in excess of 2000, namely 2200, is added to an adhesive composition containing a copolymer of butene-1 and ethylene and a tackifier a significantly higher peel strength is obtained than in Runs Nos. 1, 2 and 5, far in excess of the minimum (1000) for adhesion to polyethylene and the minimum (500) for adhesion to polypropylene.

A further series of runs was made similar to those of Table IV but wherein a selected amount of the low molecular weight liquid polybutene was replaced with wax. The data obtained are set forth below in Table V.

TABLE V

|  | Run No. | | | |
|---|---|---|---|---|
|  | 10 | 11 | 12 | 13 |
|  | Parts by Weight, Grams | | | |
| Polybutylene, Duraflex 8910 | 30.00 | 30.00 | 30.00 | 30.00 |
| Wingtack 95 (Tackifier) | 35.00 | 35.00 | 35.00 | 30.00 |
| Shellmax 400 (Wax) | 17.50 | 26.20 | — | — |
| Shellwax 300 (Wax) | — | — | 17.50 | — |
| Multiwax 180M (Wax) | — | — | — | 25.00 |
| Parapol 2200 (low mol. wt. polybutene) | 17.50 | 8.80 | 17.50 | 15.00 |

TABLE V-continued

|  | Run No. | | | |
|---|---|---|---|---|
|  | 10 | 11 | 12 | 13 |
|  | Parts by Weight, Grams | | | |
| Isonox 129/DLTDP (1:3 wt. ratio) | 0.40 | 0.40 | 0.40 | 0.40 |
| Total | 100.40 | 100.40 | 100.40 | 100.40 |
| Properties | | | | |
| Stability | OK | OK | OK | OK |
| Ring & Ball Soft. Pt. | | | | |
| (R&B)°F. | 190 | 188 | 180 | 191 |
| (°C.) | (87.8) | (86.7) | (82.2) | (88.3) |
| Viscosity, cps, 350°(176.6° C.) | 800 | 600 | 700 | 600 |
| N.P., decimillimeter (dmm), 77° (25° C.) | 22.7 | 28.0 | 21.8 | 36.4 |
| Performance Peel Strength, g/in., 50 mm/min. | | | | |
| HDPE/HDPE (4 mil) | 2520 | 2070 | 1620 | 1260 |
| PP/PP (3 mil) | 1950 | 720 | 2040 | 675 |

The results obtained above are unexpected and quite unusual. Compare, for example Run No. 10 with Run No. 6. Note that Run No. 10 is similar to Run No. 6, except that half of the low molecular weight liquid polybutene was replaced with a wax. Although such replacement resulted in a slight reduction in peel strengths, they are far above the minimum peel strengths desired (1000 for HDPE and 500 for PP) and greatly above the results obtained in Table III wherein wax was present but no low molecular weight liquid polybutene. When the amount of low molecular weight liquid polybutene was still further reduced in Run No. 11 and the amount of wax was correspondingly increased, the performance was not as good as in Run No. 10 but still substantially higher than the results obtained in Runs Nos. 1 and 2. Runs Nos. 12 and 13 further confirm that as long as a low molecular weight, that is, greater than about 2000, liquid polybutene is present in the claimed composition herein wax can still be present and an adhesive composition having excellent peel strength characteristics is obtained.

That the molecular weight of the low molecular weight liquid polybutene used herein is critical in the preparation of the novel hot melt adhesive is apparent from an inspection of the data in Table VI.

TABLE VI

|  | Run No. | |
|---|---|---|
|  | 14 | 15 |
|  | Parts by Weight, Grams | |
| Polybutylene, Duraflex 8910 | 25.00 | — |
| Polybutylene, Duraflex 8 × 10 | — | 25.00 |
| Wingtack 95 (Tackifier) | 30.00 | 30.00 |
| Indopol H-100 (low mol. wt. polybutene) | 45.00 | — |
| Indopol H-300 (low mol. wt. polybutene) | — | 45.00 |
| Isonox 129/DLTDP (1:3 wt. ratio) | 0.40 | 0.40 |
| Total | 100.40 | 100.40 |
| Properties | | |
| Stability | OK | OK |
| Ring & Ball Soft. Pt. | | |
| (R&B)° | 195 | 210 |
| (°C.) | (90.6) | (98.9) |
| Viscosity, cps, 350°(176.63° C.) | 7000 | 2050 |
| N.P., decimillimeter (dmm), 77°(25° C.) | 55.2 | 48.3 |
| Performance Peel Strength, g/in., | | |

TABLE VI-continued

| | Run No. | |
|---|---|---|
| | 14 | 15 |
| | Parts by Weight, Grams | |
| 50 mm/min. | | |
| HDPE/HDPE (4 mil) | 720 | 540 |
| PP/PP (3 mil) | 450 | 360 |

The above runs should be compared with Run No. 6, which is most similar thereto, in that while in Run No. 6 the low molecular weight liquid polybutene has a molecular weight of 2200, the molecular weight of the polybutene, Indopol H-100, in Run No. 14 is 920 and the molecular weight of the polybutene, Indopol H-300, in Run No. 15 is 1290. Note that while extremely high peel strengths were obtained in Run No. 6, 3150 for HDPE/HDPE and 2025 for PP/PP, in Runs Nos. 14 and 15 the best that was obtained was 720 for HDPE/HDPE and 450 for PP/PP, a totally unsatisfactory performance, not much different than the results obtained in the base runs of Table I wherein no low molecular weight liquid polybutene was used. The same undesirable results obtained in Runs Nos. 14 and 15 would be expected to be obtained by Flanagen et al in U.S. Pat. No. 3,573,240, in Composition E in column 7, wherein a liquid polybutylene having a molecular weight of 1000, as a wax (see column 4, lines 32 to 51), is added to a mixture containing a homopolymeric isotactic polybutylene resin and a tackifier. Obviously, many modifications and variations of the invention, as hereinbefore set forth, can be made without departing from the spirit and scope thereof and therefore only such limitations should be imposed as are indicated in the appended claims.

We claim:

1. A compatible polymer blend useful as a melt adhesive comprising a copolymer of butene-1 and from about 5.5 to about 20 weight percent of an olefin selected from the group consisting of ethylene and propylene, a hydrocarbon tackifier, and a low molecular weight liquid polybutene having a molecular weight greater than about 2000.

2. The polymer blend of claim 1 wherein said copolymer is a copolymer of butene-1 and ethylene.

3. The polymer blend of claim 2 wherein said copolymer contains from about 5.5 to about 10 weight percent of ethylene.

4. The polymer blend of claim 2 wherein said copolymer has a melt index in the range of about 0.3 to about 2000 grams/10 minutes.

5. The polymer blend of claim 2 wherein said copolymer has a melt index in the range of about 3.0 to about 2000 grams/10 minutes.

6. The polymer blend of claim 2 wherein said hydrocarbon tackifier has a ring and ball softening point in the range of about 10° to about 150° C.

7. The polymer blend of claim 2 wherein said hydrocarbon tackifier has a ring and ball softening point in the range of about 25° to about 120° C.

8. The polymer blend of claim 2 wherein said low molecular weight liquid polybutene has a molecular weight from about 2000 to about 6000.

9. The polymer blend of claim 2 wherein said copolymer has a melt index in the range of about 0.3 to about 2000 grams/10 minutes, said hydrocarbon tackifier has a ring and ball softening point in the range of about 10° to about 150° C. and said low molecular weight liquid polybutene has a molecular weight from about 2000 to about 6000.

10. The polymer blend of claim 2 wherein said copolymer contains from about 5.5 to about 10 weight percent of ethylene and has a melt index in the range of about 3 to about 2000 grams/10 minutes, said hydrocarbon tackifier has a ring and ball softening point in the range of about 25° to about 120° C. and said low molecular weight liquid polybutene has a molecular weight from about 2000 to about 6000.

11. The polymer blend of claim 2 wherein said components are present in the following amounts:

| | Weight Percent |
|---|---|
| Butene-1 Copolymer | 20-60 |
| Hydrocarbon Tackifier | 20-50 |
| Low Molecular Weight Liquid Polybutene | 10-60 |

12. The polymer blend of claim 2 wherein said components are present in the following amounts:

| | Weight Percent |
|---|---|
| Butene-1 Copolymer | 25-50 |
| Hydrocarbon Tackifier | 25-40 |
| Low Molecular Weight Liquid Polybutene | 15-40 |

13. The polymer blend of claim 2 wherein a paraffin wax or a microcrystalline wax is also present.

14. The polymer blend of claim 2 wherein an antioxidant is also present.

15. The polymer blend of claim 2 wherein a paraffin wax or a microcrystalline and an antioxidant are also present.

16. The polymer blend of claim 2 wherein said copolymer has a melt index in the range of about 0.3 to about 2000 grams/10 minutes, said hydrocarbon tackifier has a ring and ball softening point in the range of about 10° to about 150° C. and said low molecular weight liquid polybutene has a molecular weight from about 2000 to about 6000, said components being present in the following amounts:

| | Weight Percent |
|---|---|
| Butene-1 Copolymer | 20-60 |
| Hydrocarbon Tackifier | 20-50 |
| Low Molecular Weight Liquid Polybutene | 10-60 |

17. The polymer blend of claim 2 wherein said copolymer contains from about 5.5 to about 10 weight percent of ethylene and has a melt index in the range of about 3 to about 2000 grams/10 minutes, said hydrocarbon tackifier has a ring and ball softening point in the range of about 25° to about 120° C. and said low molecular weight liquid polybutene has a molecular weight from about 2000 to about 6000, said components being present in the following amounts:

| | Weight Percent |
|---|---|
| Butene-1 Copolymer | 25-50 |
| Hydrocarbon Tackifier | 25-40 |
| Low Molecular Weight Liquid Polybutene | 10-40 |

* * * * *